United States Patent
Lee et al.

(10) Patent No.: US 10,539,414 B2
(45) Date of Patent: Jan. 21, 2020

(54) DETERMINING TUBING WALL THICKNESS

(71) Applicant: Halliburton Energy Services, Inc., Houston, TX (US)

(72) Inventors: Dongwon Lee, Kingwood, TX (US); Weijun Guo, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 99 days.

(21) Appl. No.: 15/755,967

(22) PCT Filed: Oct. 8, 2015

(86) PCT No.: PCT/US2015/054671
§ 371 (c)(1),
(2) Date: Feb. 27, 2018

(87) PCT Pub. No.: WO2017/062011
PCT Pub. Date: Apr. 13, 2017

(65) Prior Publication Data
US 2018/0292204 A1    Oct. 11, 2018

(51) Int. Cl.
*G01V 5/08*  (2006.01)
*G01B 15/02*  (2006.01)
(Continued)

(52) U.S. Cl.
CPC ............. *G01B 15/02* (2013.01); *E21B 47/00* (2013.01); *G01V 5/125* (2013.01); *E21B 17/1078* (2013.01)

(58) Field of Classification Search
None
See application file for complete search history.

(56) References Cited

U.S. PATENT DOCUMENTS 4,450,354 A    5/1984  Smith et al.
4,825,454 A    4/1989  Annis et al.
(Continued)

FOREIGN PATENT DOCUMENTS

WO    97/33141    11/1997
WO    2015-102587    7/2015

OTHER PUBLICATIONS

International Search Report and Written Opinion for PCT/US2015/054671 dated Jun. 29, 2016.

*Primary Examiner* — Hoon K Song
(74) *Attorney, Agent, or Firm* — Benjamin Fite; C. Tumey Law Group PLLC

(57) ABSTRACT

A method for monitoring tubing wall thickness includes conveying a tool through a tubular string in a borehole, the tool including a photon source that directs a photon beam along a radial path toward a wall of the borehole, the tool further including an array of collimated detectors that measure Compton backscattering rates at respective distance bins along the radial path. The method further includes calculating a sequence of ratios between measurements from neighboring detectors. The method further includes identifying one or more local extrema in the sequence, each extremum representing a boundary between different materials. The method further includes determining a wall thickness of the tubular string from absolute or relative positions of the one or more extrema. The method further includes displaying a representation of the wall thickness.

20 Claims, 3 Drawing Sheets

(51) Int. Cl.
  *E21B 47/00* (2012.01)
  *G01V 5/12* (2006.01)
  *E21B 17/10* (2006.01)

(56) References Cited

U.S. PATENT DOCUMENTS

| | | | | |
|---|---|---|---|---|
| 5,195,117 A * | 3/1993 | Ong | ................ | G01B 15/02 |
| | | | | 378/70 |
| 8,138,471 B1 * | 3/2012 | Shedlock | ................ | G01V 5/08 |
| | | | | 250/269.1 |
| 2005/0105665 A1 * | 5/2005 | Grodzins | ................ | G01N 23/04 |
| | | | | 376/157 |

* cited by examiner

DETERMINING TUBING WALL THICKNESS

BACKGROUND

Scaling, corrosion, precipitates, and material defects are problems faced by the oil and gas industry when managing production well and pipeline assets. These problems lead to diminished production in wells, casing integrity failure, and pipeline integrity failure any of which may result in costly and complex remediation measures. Consequently, a number of techniques have been developed for measuring and, over time, monitoring the thickness of tubing walls of wells and pipelines. Of these, the radiation-based techniques can be divided into two broad categories: "transmission" techniques and "backscatter" techniques.

In the transmission technique, an object such as pipeline is targeted with radiation. The radiation is generated on one side of the object, transmitted through the object, and received on a film or similar detector on the opposite side of the object. A photograph or image qualitatively depicting pitting within a pipe is generated. The transmission technique is unsatisfactory for multiple reasons. First, pipeline often runs in bundles, and as such, it is difficult to detect radiation corresponding to a particular strand of pipe. Second, two sides of the pipe are measured together, rather than individually, resulting in undesirable summing or averaging of measured quantities. Third, trained technicians interpret the image resulting in decisions based on qualitative interpretations rather than quantitative data. Fourth, and most importantly, transmission-based techniques are not suitable for wells, where the measurements are necessarily acquired from inside the tubular.

The backscatter technique, when employed externally, uses a scanning detector to form a line image of, e.g., a steel pipe as it is penetrated by a fine X-ray beam. When employed from inside the pipe, the tool emits the X-ray beam and monitors the backscatter intensity as a function of position. The scatter intensity is proportional to the electron density of the pipe. Ideally, the resulting image represents a density profile of the pipe along the beam and can reveal the presence of moisture, steel, and corrosion. However, due to tradeoffs between source strength, resolution, and measurement variation, the material boundaries are often blurred and difficult to distinguish or measure with precision.

BRIEF DESCRIPTION OF THE DRAWINGS

Accordingly, improved systems and methods for determining tubing wall thickness are disclosed herein, in the following detailed description of the various disclosed embodiments, reference will be made to the accompanying drawings in which.

Figure 1:
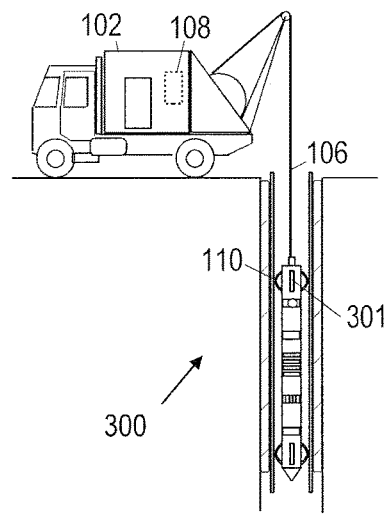
FIG. 1 is a contextual view of an illustrative wireline environment.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

NOTATION AND NOMENCLATURE

Certain terms are used throughout the following description and claims to refer to particular system components and configurations. As one of ordinary skill will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or a direct electrical or physical connection. Thus, if a first device couples to a second device, that connection may be through a direct electrical connection, through an indirect electrical connection via other devices and connections, through a direct physical connection, or through an indirect physical connection via other devices and connections in various embodiments.

DETAILED DESCRIPTION

The issues identified in the background are at least partly addressed by improved systems and methods for determining thicknesses such as tubing wall thickness using ratios of backscattered photons. The disclosed systems and methods for determining such thicknesses are best understood in terms of the context in which they are employed. As such, FIG. 1 shows an illustrative wireline environment. A logging truck 102 may suspend a wireline tool 301 that is included in a system 300 for determining tubing wall thickness, described in greater detail with respect to FIG. 3, on a wireline cable 106. The wireline cable 106 includes conductors for transporting power to the tool 301 and telemetry from the tool 301 to the surface. On the surface, a computer 108 acquires and stores measurement data from the tool 301 as a function of position along the borehole and as a function of azimuth. The computer 108 processes data received from the tool 301 and generates a representative display for the driller to perceive. Software may run on the computer 108 to collect the data and organize it in a file or database. Specifically, a processor coupled to memory may execute the software. The software may respond to user input via a keyboard or other input mechanism to display data as an image or movie on a monitor or other output mechanism. The software may process the data to determine tubing wall thickness as described below. In at least one embodiment, the computer 108 is located downhole within a housing able to protect the computer 108 from the harsh downhole environment. In another embodiment, processors both at the surface and downhole may work together or independently to obtain, store, and process measurement data.

Centralizers 110 keep the tool 301 centered. The tool 301 may further include an orientation module and a control/telemetry module for coordinating the operations of the various tools and communications between the various instruments and the surface. In at least one embodiment, a slickline is used to suspend the tool 301. Slicklines are single-strand non-electric cables that may be lowered into boreholes from the surface to suspend tools, adjust valves and sleeves located downhole, and repair tubing within the wellbore. A slickline may be wrapped around a drum on the back of a truck, and the slickline may be raised and lowered in the borehole hydraulically. Because a slickline does not provide power, the tool 301 may include a battery in such an embodiment.

The tool 301, when inserted into the casing, is radially adjacent to the casing, the set cement, and the borehole in that order. In some instances, the tool 301 may be suspended in a fluid such as water, creating a layer of material in front of the casing. The thicknesses of these layers of material, including the casing, may be determined by the tool 301 as described with respect to FIG. 3.

Figure 2:
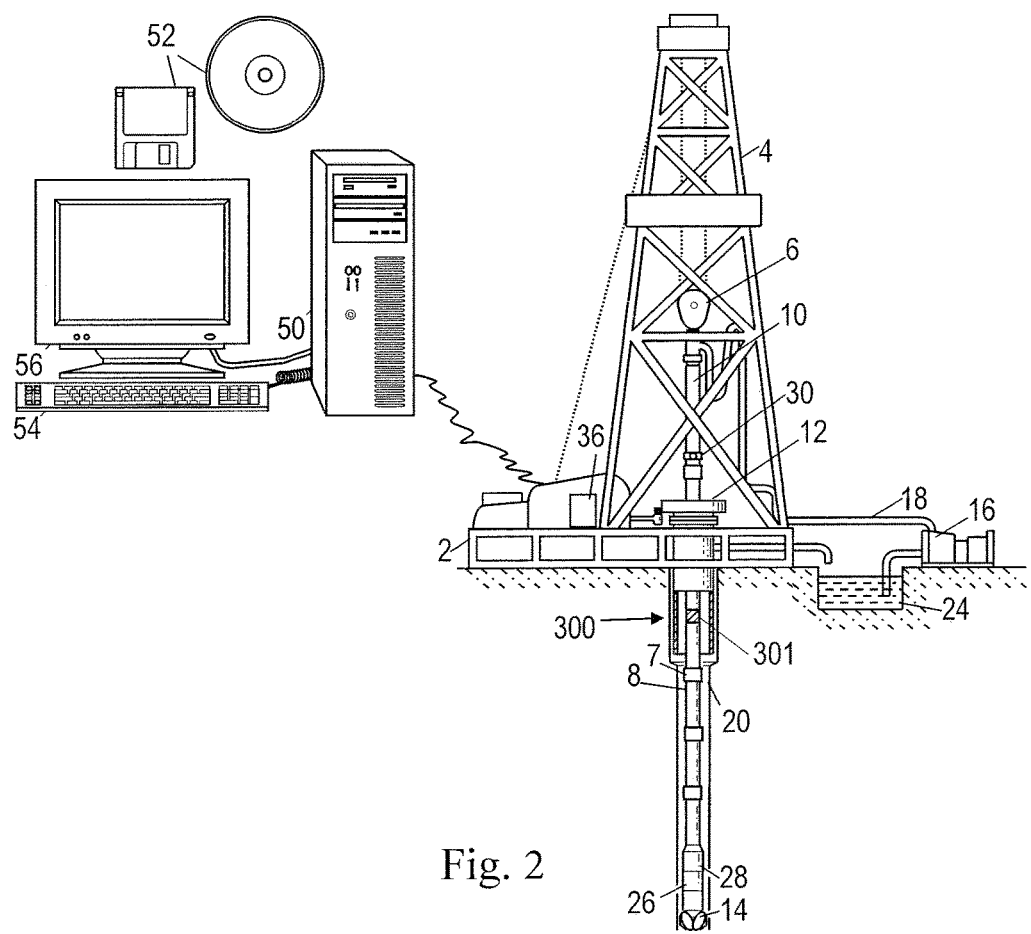
FIG. 2 is a contextual view of an illustrative drilling environment.
Figure 3:
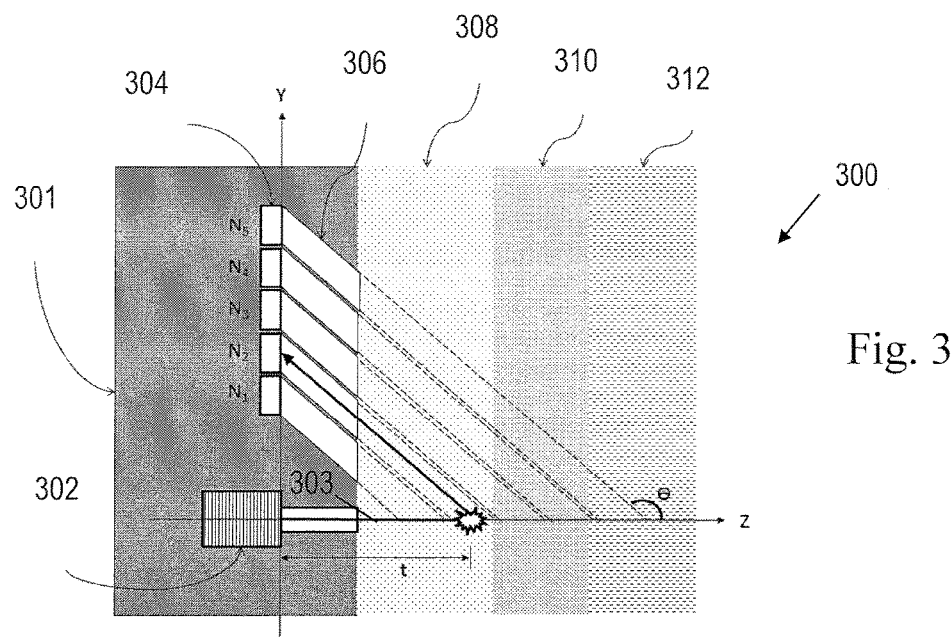
FIG. 3 is a cross-sectional view of an illustrative system for determining tubing wall thickness.

FIG. 2 shows a well in a drilling environment in which a system 300 for determining tubing wall thickness, described in greater detail with respect to FIG. 3, that includes a tool 301 on the drill string 8. The tool 301 may be located at any point on the drill string 8. Although not every portion of the borehole 20 is cased, such as the portions near the bit 14, the system 300 may determine the thickness of the cased portions while drilling or during a pause in drilling in various embodiments. A drilling platform 2 is equipped with a derrick 4 that supports a hoist 6. The platform 2 may also be located offshore for subsea drilling purposes in at least one embodiment. Drilling of oil and gas wells is carried out by a string of drill pipes connected together by "tool" joints 7 so as to form the drill string 8. The hoist 6 suspends a kelly 10 that lowers the drill string 8 through a rotary table 12. Connected to the lower end of the drill string 8 is a drill bit 14. The bit 14 is rotated and drilling of the borehole 20 is accomplished by rotating the drill string 8, by use of a downhole motor near the drill bit, or by both methods.

Drilling fluid, termed mud, is pumped by mud recirculation equipment 16 through a supply pipe 18, through the kelly 10, and down through the drill string 8 at high pressures and volumes to emerge through nozzles or jets in the drill bit 14. The mud then travels back up the hole via the annulus formed between the exterior of the drill string 8 and the borehole wall 20, through a blowout preventer, and into a mud pit 24 on the surface. On the surface, the drilling mud is cleaned and then recirculated by recirculation equipment 16.

For a logging while drilling ("LWD") environment, downhole sensors 26 are located in the drillstring 8 near the drill bit 14. The sensors 26 may include directional instrumentation and LWD tools. The directional instrumentation measures the inclination angle, the horizontal angle, and the azimuthal angle (also known as the rotational or "tool face" angle) of the LWD tools. As is commonly defined in the art, the inclination angle is the deviation from vertically downward, the horizontal angle is the angle in a horizontal plane from true North, and the tool face angle is the orientation (rotational about the tool axis) angle from the high side of the well bore. In addition, a gyroscope or other form of inertial sensor may be incorporated to perform position measurements and further refine the orientation measurements.

In some embodiments, downhole sensors 26 are coupled to a telemetry transmitter 28 that transmits telemetry signals by modulating the mud flow in drill string 8. A telemetry receiver 30 is coupled to the kelly 10 to receive transmitted telemetry signals. Other telemetry transmission techniques may also be used. The receiver 30 communicates the telemetry to an acquisition module 36 coupled to a data processing system 50.

A data processing system 50 may be coupled to a measurement unit on the platform 2 by a wired connection 49 or wireless connection, and may periodically obtain measurement data from the measurement unit as a function of position and/or time. Among other things, the system 50 processes data received from the acquisition module 36 and generates a representative display for the driller to perceive. Software (represented by information storage media 52) may run on the data processing system 50 to collect the data and organize it in a file or database. Specifically, a processor coupled to memory may execute the software. The software may respond to user input via a keyboard 54 or other input mechanism to display data as an image or movie on a monitor 56 or other output mechanism. The software may process the data to determine tubing wall thickness as described below. In at least one embodiment, the data processing system 50 is located downhole within a housing able to protect the system 50 from the harsh downhole environment. In another embodiment, processors both at the surface and downhole may work together or independently to obtain, store, and process measurement data.

FIG. 3 is a cross-sectional view of an illustrative system 300 for accurately determining and monitoring the thickness of layers of material. By monitoring the thickness of materials such as tubing, lower-cost preventative action may be taken before problems such as decreasing pipe integrity cause higher-cost remedial action to be necessary. Similarly, cement integrity may be monitored and repaired before costly breaches occur. The system 300 includes a tool 301 having a photon source 302 to direct a photon beam 303 along a radial path toward a wall of the borehole. For example, the tool 301 may be a sectional sub, an instrument on a logging tool, an instrument on an inspection tool, or a separate downhole tool itself. The photon source 302 may emit photons at one or more energies or over broad range of energy. As such, the photon source 302 may include a chemical source such as Cs-137, may produce gamma-rays from neutron activation, or may include an electronic source such as an x-ray tube. The photons penetrate the layers of material 308, 310, 312 and some photons are backscattered due to collisions with electrons in the layers of material 308, 310, 312. The loss of energy due to the collision is known as the Compton Effect.

The tool 301 further includes an array of collimated detectors 304 to measure Compton backscattering rates at respective distance bins along the radial path. In at least one embodiment, the detectors 304 are scintillators optically coupled to photomultiplier tubes ("PMTs") or photodiodes that produce a signal when a photon is detected. In this way, the number of photons detected at each detector 304 can be counted and recorded by hardware and software coupled to the detectors 304. Collimators 306 filter photons not backscattered at substantially the angle θ, while the distance photons travel from the photon source 302 before being backscattered determines which detector 304 receives the photons. For example, a photon may be backscattered at a distance t from the photon source 302 at an angle that is substantially θ from the horizontal. A collimator 306 coupled to detector $N_2$ filters photons not backscattered at substantially the angle θ. Because t is within a certain range of distances from the photon source, the backscattered photon is detected by detector $N_2$.

The collimator 306 geometry is designed to accept the photons with single Compton backscattering while filtering photons that are subject to multiple Compton scatterings. In at least one embodiment, each detector 304 element is 2 mm in height and θ is 135 degrees. However, these values may be adjusted as desired. The tool 301 may also include a detector-source housing, which accommodates both the detectors 304 and the photon source 302. The housing may include shielding material to prevent emitted photons from hitting the detector directly, i.e., without being backscattered.

Figure 4:
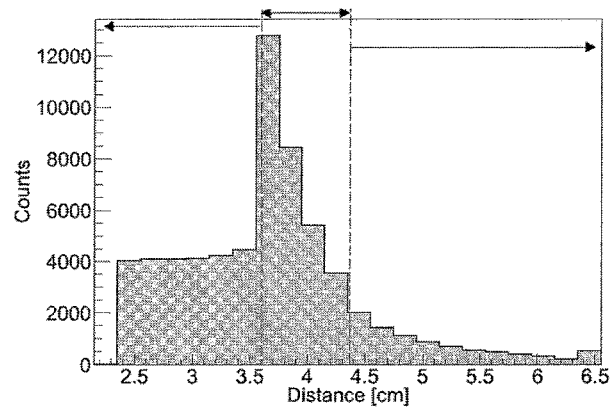
FIG. 4 is a chart of an illustrative number of detected backscattered photons.
Figure 5:
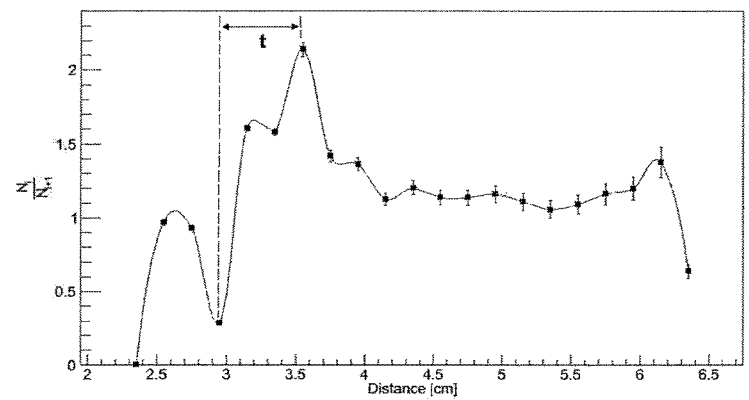
FIG. 5 is a chart of an illustrative comparison between groups of detected backscattered photons.

With respect to FIG. 3, the use of the tool 301 has been described using one orientation and one depth for clarity. However, the tool 301 may operate at multiple depths as the tool 301 is conveyed along the borehole. Also, the tool 301 may be rotated within the borehole to obtain measurements in any azimuthal direction. In this way, a complete representation of the layers of material 308, 310, 312 may be obtained, processed, and displayed. FIGS. 4 and 5 show example data useful for illustrating how measurements are processed. For example, the tool 301 may further include a processor coupled to memory to record the number of photons detected by each detector 304 (as explained with respect to FIG. 4) and calculate a sequence of ratios between measurements from neighboring detectors 304 (as explained with respect to FIG. 5).

FIG. 4 is a bar chart of an illustrative number of detected backscattered photons. Each bar represents a detector. Each detector is located a certain distance from the photon source (x-axis of the chart) and detects a certain number of photons (y-axis of the chart). As such, neighboring bars represent neighboring detectors. The ratio between the numbers of photons detected by neighboring detectors is relatively constant if photons are scattered from the same material. For example, in the section of the chart representing a steel easing layer, the ratio of photons detected by neighboring detectors is relatively constant. Similarly, in the sections of the chart representing a water layer and a cement layer, the ratio of photons detected by neighboring detectors is relatively constant. However the ratio is not relatively constant when photons are scattered by different materials. For example, in the section of the chart representing a boundary between the water layer and the steel casing layer, the ratio of photons detected by neighboring detectors is not repeated either directly before or directly after the boundary. Similarly, in the section of the chart representing a boundary between the steel casing layer and the cement layer, the ratio of photons detected by neighboring detectors is not repeated either directly before or directly after the boundary. A plot of these ratios reveals characteristic valleys and peaks when there are transitions in materials as illustrated in FIG. 5.

FIG. 5 is a chart of an illustrative comparison between groups of detected backscattered photons. Each point represents a ratio between neighboring detectors (y-axis) at a certain distance from the photon source (x-axis). The points are connected by curves of best fit, and one or more local extrema that identify boundaries in the layers of material become evident. For example, a peak-to-valley distance t represents the thickness of the steel casing with the peak identifying an outer wall of the casing and the valley identifying the inner wall of the casing. By calculating the distance between the peak and valley, the thickness of the casing may be determined. In this way, the thickness of any of the layers of material may be determined and displayed. The display may show thickness as a function of position along the borehole and/or as a function of azimuth around the borehole.

Figure 6:
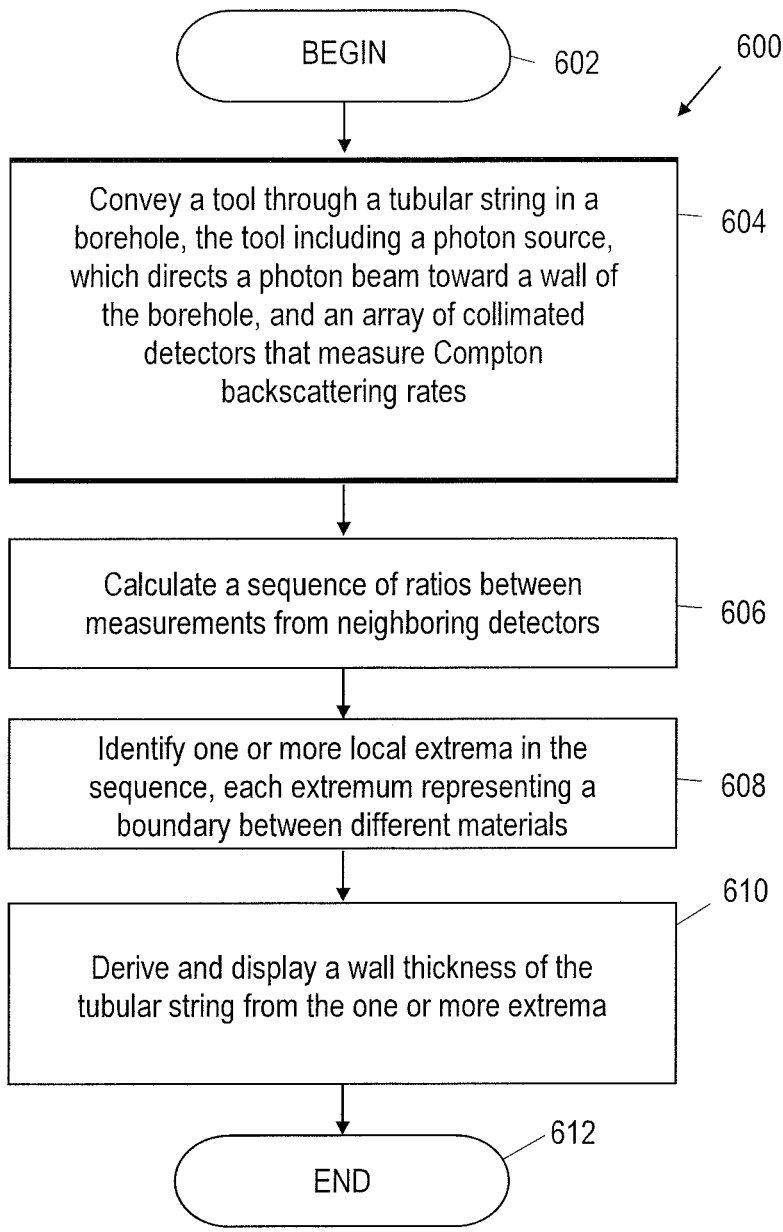
FIG. 6 is a flow diagram of an illustrative method for determining tubing wall thickness using photons.

FIG. 6 is a flow diagram of an illustrative method 600 of determining thickness using photons beginning at 602 and ending at 612. At 604, a tool is conveyed through a tubular string in a borehole. The tool includes a photon source that directs a photon beam along a radial path toward a wall of the borehole and an array of collimated detectors that measure Compton backscattering rates at respective distance bins along the radial path. For example, the array may include at least eight collimated detectors. The photon source may be maintained at a fixed distance from an inner wall of a tubular string.

At 606, a sequence of ratios between measurements from neighboring detectors is calculated. In at least one embodiment, the number of photons detected by neighboring detectors are compared in ratio form. These ratios characterize the material backscattering the photons when compared. For example, the ratio between the numbers of photons detected by neighboring detectors is relatively constant if photons are scattered from the same material. However the ratio is not relatively constant when photons are scattered by different materials.

At 608, one or more local extrema in the sequence of ratios are identified, each extremism representing a boundary between different materials. The one or more local extrema may include a valley representing an inner wall of the tubular string and a peak representing an outer wall of the tubular string.

At 610, the thickness of the material, e.g. the wall thickness of the tubular string, is determined from absolute or relative positions of the one or more extrema, and a representation of the wall thickness is displayed. The wall thickness may be determined by calculating a distance between the valley and the peak in at least one embodiment. In this way, the thickness of multiple layers of material may be determined. The representation displayed may show wall thickness as a function of position along the borehole and/or as a function of azimuth around the borehole.

In at least one embodiment, a method for monitoring tubing wall thickness includes conveying a tool through a tubular string in a borehole, the tool including a photon source that directs a photon beam along a radial path toward a wall of the borehole, the tool further including an array of collimated detectors that measure Compton backscattering rates at respective distance bins along the radial path. The method further includes calculating a sequence of ratios between measurements from neighboring detectors. The method further includes identifying one or more local extrema in the sequence, each extremum representing a boundary between different materials. The method further includes determining a wall thickness of the tubular string from absolute or relative positions of the one or more extrema. The method further includes displaying a representation of the wall thickness.

In another embodiment, an apparatus for monitoring tubing wall thickness includes a photon source to direct a photon beam along a radial path toward a wall of the borehole. The apparatus further includes an array of collimated detectors to measure Compton backscattering rates at respective distance bins along the radial path. The apparatus further includes a processor to calculate a sequence of ratios between measurements from neighboring detectors, identify one or more local extrema in the sequence, each extremum representing a boundary between different materials, and determine a wall thickness of the tubular string from absolute or relative positions of the one or more extrema.

The following features may be incorporated into the various embodiments. The representation may show wall thickness as a function of position along the borehole. The representation may show wall thickness as a function of azimuth around the borehole. The one or more local extrema may include a valley representing an inner wall of the tubular string and a peak representing an outer wall of the tubular string. A distance between the valley and the peak may be calculated. The tubular string may be casing. The tubular string may be surrounded by a casing string, and the one or more local extrema may further include a valley and peak representing walls of the casing string. A distance between the valley and peak representing walls of the casing string may be calculated to obtain a wall thickness of the casing string. The photon source may be maintained at a fixed distance from an inner wall of the tubular string. At least one of the one or more local extrema may represent an outer wall of the tubular string, and an absolute position of the at least one extrema may be converted to the wall thickness. The array may include at least eight collimated detectors. A processor may output for display a representation of the wall thickness.

While the present disclosure has been described with respect to a limited number of embodiments, those skilled in the art will appreciate numerous modifications and variations therefrom. It is intended that the appended claims cover all such modifications and variations.

What is claimed is:

1. A method for monitoring tubing wall thickness, the method comprising:
    conveying a tool through a tubular string in a borehole, the tool comprising a photon source that directs a photon beam along a radial path toward a wall of the borehole, the tool further comprising an array of collimated detectors that measure Compton backscattering rates at respective distance bins along the radial path;
    calculating a sequence of ratios between measurements from neighboring detectors;
    identifying one or more local extrema in the sequence, each extremum representing a boundary between different materials;
    determining a wall thickness of the tubular string from absolute or relative positions of the one or more extrema; and
    displaying a representation of the wall thickness.

2. The method of claim 1, wherein the representation shows wall thickness as a function of position along the borehole.

3. The method of claim 2, wherein the representation shows wall thickness as a function of azimuth around the borehole.

4. The method of claim 1, wherein the one or more local extrema comprise a valley representing an inner wall of the tubular string and a peak representing an outer wall of the tubular string.

5. The method of claim 4, wherein determining the wall thickness comprises calculating a distance between the valley and the peak.

6. The method of claim 4, wherein the tubular string is casing.

7. The method of claim 4, wherein the tubular string is surrounded by a casing string, and the one or more local extrema further comprise a valley and peak representing walls of the casing string.

8. The method of claim 7, wherein determining the wall thickness comprises calculating a distance between the valley and peak representing walls of the casing string to obtain a wall thickness of the casing string.

9. The method of claim 1, wherein the photon source is maintained at a fixed distance from an inner wall of the tubular string, wherein at least one of the one or more local extrema represents an outer wall of the tubular string, and wherein determining the wall thickness comprises converting an absolute position of the at least one extrema to the wall thickness.

10. The method of claim 1, wherein the array comprises at least eight collimated detectors.

11. An apparatus for monitoring tubing wall thickness, comprising:
    a photon source to direct a photon beam along a radial path toward a wall of the borehole;
    an array of collimated detectors to measure Compton backscattering rates at respective distance bins along the radial path; and
    a processor to calculate a sequence of ratios between measurements from neighboring detectors, identify one or more local extrema in the sequence, each extremum representing a boundary between different materials, and determine a wall thickness of the tubular string from absolute or relative positions of the one or more extrema.

12. The apparatus of claim 11, wherein the processor outputs for display a representation of the wall thickness.

13. The apparatus of claim 12, wherein the representation shows wall thickness as a function of position along the borehole.

14. The apparatus of claim 13, wherein the representation shows wall thickness as a function of azimuth around the borehole.

15. The apparatus of claim 11, wherein the one or more local extrema comprise a valley representing an inner wall of the tubular string and a peak representing an outer wall of the tubular string.

16. The apparatus of claim 15, wherein determining the wall thickness comprises calculating a distance between the valley and the peak.

17. The apparatus of claim 15, wherein the tubular string is casing.

18. The apparatus of claim 15, wherein the tubular string is surrounded by a casing string, and the one or more local extrema further comprise a valley and peak representing walls of the casing string.

19. The apparatus of claim 18, wherein determining the wall thickness comprises calculating a distance between the valley and peak representing walls of the casing string to obtain a wall thickness of the casing string.

20. The apparatus of claim 11, wherein the photon source is maintained at a fixed distance from an inner wall of the tubular string, wherein at least one of the one or more local extrema represents an outer wall of the tubular string, and wherein determining the wall thickness comprises converting an absolute position of the at least one extrema to the wall thickness.

* * * * *